United States Patent [19]

Pamer

[11] 3,949,961
[45] Apr. 13, 1976

[54] MATERIAL HANDLING APPARATUS
[75] Inventor: Karl A. Pamer, Chagrin Falls, Ohio
[73] Assignee: McNeil Corporation, Akron, Ohio
[22] Filed: Feb. 25, 1974
[21] Appl. No.: 445,568

Related U.S. Application Data
[63] Continuation-in-part of Ser. Nos. 261,377, June 9, 1972, Ser. No. 261,529, June 9, 1972, Ser. No. 290,125, Sept. 18, 1972, and Ser. No. 432,688, Jan. 11, 1974.

[52] U.S. Cl. .............................. 248/317; 267/65 A
[51] Int. Cl.² ........................................ F16M 13/00
[58] Field of Search .......... 248/18, 22, 54 R, 358 R, 248/317; 277/177, 188; 267/65 A

[56] References Cited
UNITED STATES PATENTS

| | | | |
|---|---|---|---|
| 1,726,993 | 9/1929 | MacDonald | 248/317 UX |
| 2,083,277 | 6/1937 | Scott | 248/18 X |
| 2,420,104 | 5/1947 | Smith | 277/177 X |
| 2,494,598 | 1/1950 | Waring | 277/188 |
| 2,966,366 | 12/1960 | Moulton | 267/65 A X |
| 3,095,174 | 6/1963 | Dehn | 248/317 UX |
| 3,203,654 | 8/1965 | Sweeney et al. | 248/54 R |
| 3,222,017 | 12/1965 | Bobo | 248/18 X |
| 3,223,400 | 12/1965 | Deister | 248/18 X |
| 3,687,465 | 8/1972 | Grime et al. | 277/177 X |
| 3,751,024 | 8/1973 | Pineau | 267/153 |

Primary Examiner—William H. Schultz
Attorney, Agent, or Firm—Watts, Hoffmann Fisher & Heinke Co.

[57] ABSTRACT

Overhead monorail material handling system having parts supported by closed elastomer vessels or containers having liquid therein. In some applications a plurality of such vessels or containers are connected by conduit means so that the liquid can flow from one to another.

12 Claims, 4 Drawing Figures

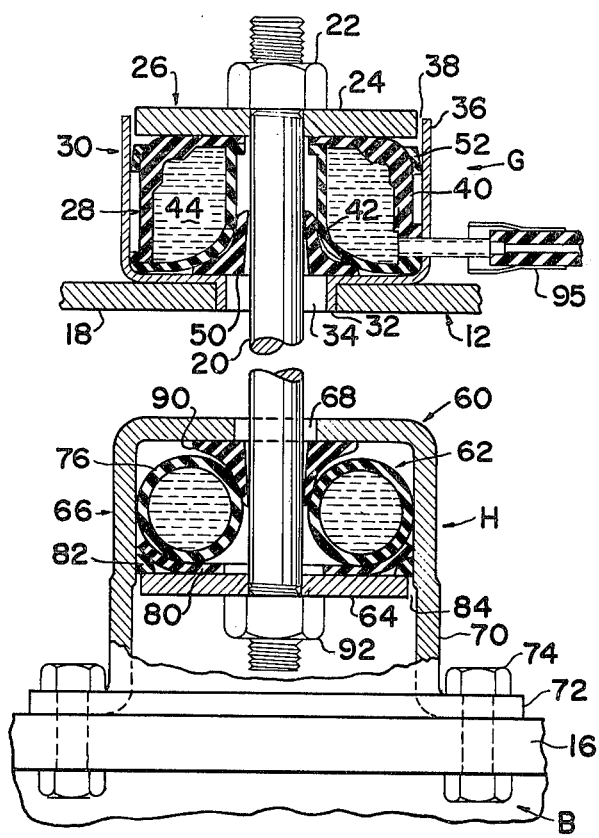
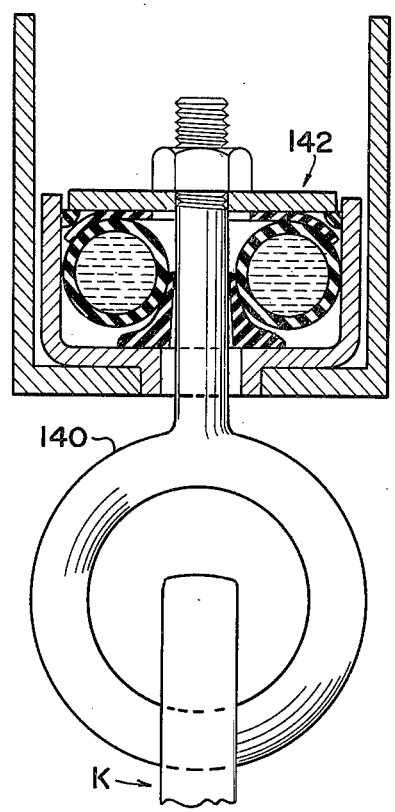
FIG. 2
FIG. 4
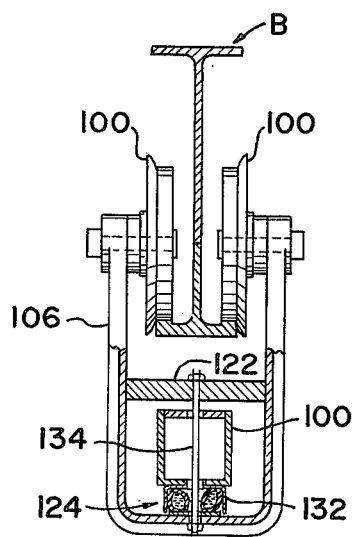
FIG. 3

MATERIAL HANDLING APPARATUS

CROSS REFERENCE TO RELATED APPLICATIONS

This application is a continuation-in-part of applications Ser. No. 261,377 and 261,529 filed June 9, 1972, Ser. No. 290,125 filed Sept. 18, 1972 and Ser. No. 432,688 filed Jan. 11, 1974, the disclosures of which are incorporated herein by reference.

BACKGROUND OF THE INVENTION

1. Field of Invention

The invention relates to carrier type overhead material handling apparatus.

2. Description of the Prior Art

Material handling apparatus having parts thereof supported by spring devices, and the like, are known but such devices are not entirely satisfactory for various reasons. Springs, for example, are typically not of the correct strength and/or resiliency for the applications in which they are used. Typical prior art devices are shown in U.S. Pat. Nos. 1,663,690, 2,642,814 and 3,174,086, the disclosures of which are incorporated herein by reference.

SUMMARY OF THE INVENTION

The invention provides a novel and improved cushioning device and more particularly novel and improved material handling apparatus, especially of the overhead, permanent installation type, such as, overhead, suspended or underslung trolley systems, including overhead cranes, etc., in which members are supported by one or more closed elastomer members including elastomer containers or vessels having fluid therein, preferably, a liquid. The elastomer members are housed in rigid parts and therewith provide limited universal relative frictionless movement between the supporting and supported members. The supported member, in effect, floats on the elastomer and the present invention provides means for protecting the members from damage, such as, abrasion and the like, because of the clearance required between the housing parts in contrast therewith. Where the elastomer vessels contain fluid and more than one is employed some may be connected by conduit means to provide for the flow of fluid from one to the other.

The invention further provides novel and improved overhead material handling apparatus easy to manufacture and install, reliable and quiet in operation, resistant to transmission of shock loads between different parts, and incorporating numerous safety features not present in prior systems.

BRIEF DESCRIPTION OF THE DRAWINGS

FIG. 2 is an enlarged view, with parts in section, of a portion of FIG. 1;

FIG. 3 is an enlarged sectional view, with parts in elevation, approximately on the line 3—3 of FIG. 1; and FIG. 4 is an enlarged sectional view, with parts in elevation, approximately on the line 4—4 of FIG. 1.

DESCRIPTION OF A PREFERRED EMBODIMENT

Figure 1:
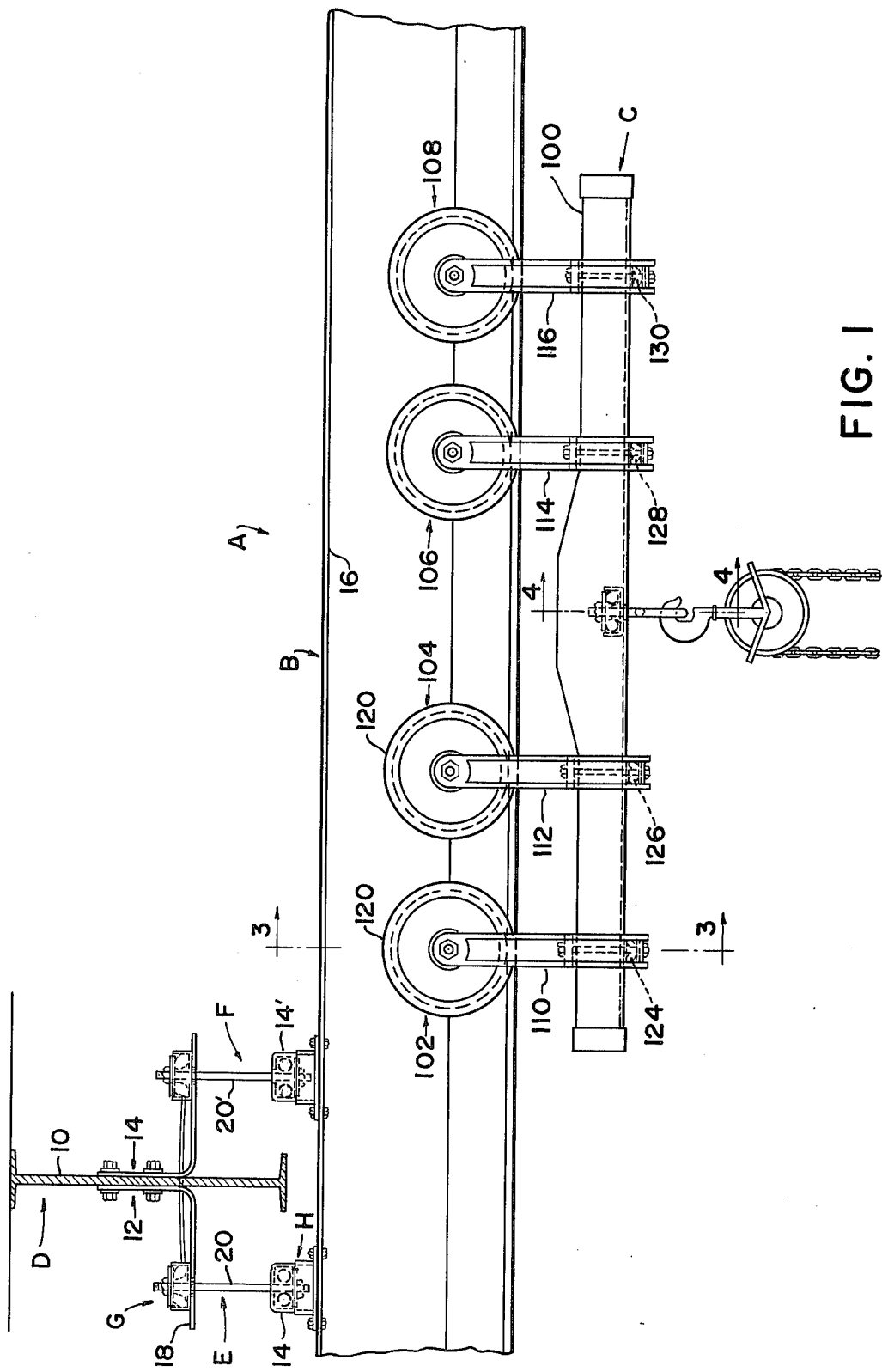
FIG. 1 is a fragmentary view of a carrier type overhead monorail material handling system embodying the present invention.

The invention is susceptible of embodiments in innumerable material handling applications, but has a special utility in overhead monorail material handling systems and is herein shown as embodied in such equipment or apparatus.

Referring to the drawings, the reference character A designates generally an overhead, material handling system comprising an I-shaped overhead combination beam-rail B along which a trolley C is movable. The trolley C, illustrated, is of the hand-propelled, carrier type. The term "trolley" as herein employed refers to any equipment supported by and movable along the rail B such as hand and/or power-propelled carrier, tractors, crank trucks, etc.

The rail B is suspended from an overhead support D, such as a building girder 10 having angle brackets 12, 14 fixed to its opposite sides by duplicate hanger assemblies or suspensions E, F connected to the rail B and the brackets 12, 14, respectively. Since the suspensions are duplicates only the suspension E is shown and described in detail. Where corresponding parts of the suspension F are identified and/or referred to, the same reference character is employed as for the suspension E, but having a prime mark applied thereto.

The suspension E connects the upper flange 16 of the rail B to the horizontal flange 18 of angle bracket 12 and comprises a hanger assembly including a hanger member in the form of a rod 20 having its opposite ends connected to upper and lower cushion support units G and H which are in turn connected to bracket 12 and rail b, respectively. The upper threaded end of the rod 20 extends through the upper support unit or assembly G and has a nut 22 threaded thereon, the bearing face of which is in engagement with the top side of a disklike member or washer 24 forming one part of the housing 26 for the elastomer vessel 28 of the unit G. The housing 26 includes a tubular cup-shaped part 30 having a downwardly extending tubular flange 32 defining an aperture 34 in the bottom thereof through which the rod 20 projects with appreciable clearance. The closed end of the tubular housing member 30 rests upon the upper side of the horizontal flange 18 of the bracket 12 with the flange 32 fitting in an aperture in the flange 18. This prevents lateral movement of the member 30 relative to the bracket 12. The upper part of the flange 36 of the cup-shaped housing part 30 surrounds at least the lower part of housing part 24 with a clearance 38 therebetween. This clearance allows the part 24 to move freely in the open end of the tubular portion of the housing part 30 and together with the clearance between the rod 20 and the tubular flange 32 of housing part 30 allows limited universal movement between the two parts of the housing 26. The part 24 of the housing 26 in effect floats upon the resilient, flexible elastomer vessel 28 or more specifically the liquid therein. The elastomer container or vessel 28 is ring-like in shape with the rod 20 extending therethrough and to facilitate is manufactured out of Neoprene and made in two parts 40, 42 suitably secured together. The closed container or vessel 28 has fluid 44 therein, preferably a suitable liquid, for example, oil.

In order to obtain the desired flexibility in the vessel 28 the walls are relatively thin and the vessel which is shown in the shape it assumes when not under load expands within the housing 26 under the weight of the load supported thereby. Normally the vessel expands until it fills the housing 26 and provision is made for preventing its expansion in the spaces between the rod 20 and the housing part 30 and the housing parts 24, 30 with resulting abrasion or other damage to the elastomer vessel because of the relative movement between the parts during operation of the device. In the support unit G this is accomplished by providing a rigid annular flange-like collar member or grommet 50 within the housing 26, surrounding the rod 20, and interposed therebetween and the lower inner wall of part 42 of the elastomer vessel and overlying the small annular opening or clearance between the ahnger rod 20 and the housing part 30, and a rigid ring-like member 52 underneath the outer part of the washer 24 and interposed between the upper outer wall of part 40 of the elastomer vessel and the adjacent inner wall of the flange 36 of the cup-shaped housing member 30 and underlying the small annular opening or clearance therebetween the parts 24, 30 of the housing 26. The members 50, 52 shown are made of a plastic.

The bottom support unit H operates in a manner essentially the same as the upper support unit G but is of modified construction. In the bottom unit H the housing 60 containing the resilient, flexible elastomer container or vessel 62 shown in non-loaded condition and which limits its expansion under load comprises a washer-like part 64 similar to the part 24 of the unit G and a cup-shaped part 66 which in this instance is inverted and has an aperture 68 in its upper end through which the hanger rod 20 projects with clearance. The annular side wall 70 of the cup-shaped part 66 extends downwardly below the member 64 and has an outwardly projecting annular flange 72 at its lower end connected by bolt 74 to the top flange 16 of the rail B. The resilient elastic ring-like, elastomer vessel 62 of the unit H is circular in cross-section, preferably made of vinyl, and contains liquid 76 similar to the liquid 44 of the elastomer vessel 28.

In order to avoid damage of the elastomer vessel 62 as it expands within the housing 60 under the weight of the load imposed thereon an elastomer washer-like member 80 is interposed between the vessel 62 and the upper surface of the housing part 64. The maximum diameter of the member 80 is slightly greater than the inside diameter of the housing part 66 in which the elastomer vessel is located with the result that the peripheral edge of the member 80 extends upwardly around the lower outer side of the vessel 62. A rigid ring-like member 82 preferably made of plastic is located underneath the circumferential portion of the member 80 and the upper side of the housing part 64. The member 82 overlies the small annular clearance 84 between the housing part 64 and the adjacent inner wall of the cup-shaped part 66 of the housing 60. A rigid grommet-like member 90, like the member 50 previously described, positioned in the housing 60 at the bottom of the cup-shaped part 66 and surrounding the hanger rod 10 prevents the upper part of the elastomer vessel 62 from expansion into the clearance between the hanger rod 20 and the sides of the aperture 86 in the housing part 66 through which it projects. The hanger rod 20 has a nut 92 threaded onto its lower end below the housing part 64 in a manner similar to that in which the nut 22 is associated with the housing part 24 of unit G.

In applications where a plurality of closely spaced suspensions are employed, some of the fluid containing elastomer vessel or container members may have their interior chambers connected by a conduit so that fluid therein can flow from one to another. In the embodiment of the invention shown in FIG. 1 the two upper support units G and G' have their elastomer vessels 28, 28' connected by conduit means 96 so that fluid can flow from the interior of one vessel to the other during operation of the supports E and F. Alternatively, the elastomer vessels of the units H, H' or G, H' or H, G' may be connected. It is preferable not to connect the elastomer vessels of more than one unit of a suspension such as, the suspension E with one elastomer vessel of one unit of a second suspension, such as, the suspension F. As previously mentioned, the elastomer vessels preferably have a liquid therein. The vessels are filled with liquid to the maximum extent practical. It is not, however, necessary that they be entirely filled with liquid because any air therein will compress when the vessels are subject to load. The enclosing of the elastomer vessel members 28, 62 in the housing assemblies 26, 60 allows the vessel members to be made smaller and/or constructed with side walls of less tensile strength and greater resiliency and flexibility for any given design load than would otherwise be the case.

Units G, H show two embodiments which in most if not all applications are interchangeable. The elastomer vessel construction shown in unit G facilitates the connection thereto of a conduit, such as, the conduit 95.

The constructions of the suspensions shown in FIGS. 1 and 2 are such that the load or weight of the rail and any trolleys travelling therealong is transferred to the overhead support through the flexible, resilient elastomer members and the limited universal movement provided by the clearance between two parts of the respective housing assemblies and between the hanger rods and the apertures in the closed ends of the cup-shaped parts of the housings permits the hanger rods to self-center and transmit the load of the rail vertically and uniformly without any tendency to bend the hanger rods. The suspension also reduces the transmission of vibrations and sound between the rail and the overhead supporting structure, the shock loading of the hanger rods and the building structure due to travel of carriers along the rail, thus extending the fatigue life of the hanger rod, etc.

The carrier-type trolley C shown comprises a load bar 100 carried by a plurality of trucks 102, 104, 106, 108 having clevis-like or U-shaped frame members 110, 112, 114, 116, respectively. The distal end of the truck frame members are provided with wheels 120 which engage and travel along parts of the lower flange of the I-shaped rail B at opposite sides of the web of the rail. Each U-shaped truck frame member has a reinforcing member 122 connected to the flange parts thereof approximately midway between their ends. The load bar 100 is supported in the truck frame members by cushion units 124, 126, 128, 130 similar to unit H previously described except that a cup-shaped housing member 132 similar to the cup-shaped housing member 30 of unit G is substituted for the cup-shaped housing member 66 of unit H. The load bar shown is box-shaped in cross-section and the units 124, 126, 128, 130 are interposed between the underside of the load bar and the horizontal web part of the frame therebelow of the trucks 102, 104, 106, 108, respectively. In the trolley illustrated the four trucks are arranged in pairs adjacent to opposite ends of the load bar and the interior chambers of the elastomer vessels of the units 124, 126 and 128, 130 at opposite ends of the trolley may be connected to one another by conduit means, if desired. Each of the trucks has a bolt 134 projecting through the web of the frame thereof and the member 122 thereabove. The bolt 134 extends through the load bar 100 and the resilient flexible unit therebeneath with sufficient clearance to allow limited universal movement of the load bar relative to its supporting trucks. The construction is simple, inexpensive and reliable and distributes the load between the trucks at opposite ends of the trolley.

The trolley C has a load grab or support K attached to the load bar 100 midway between its ends by an I-bolt 140 which is connected to the load bar through a resilient flexible support unit 142, similar to one of the units 124, 126, 128 or 130 turned upside down, to reduce and/or eliminate the transmission of vibrations, shock load, etc., between the load grab and the load bar.

The liquid filled vessel members may be of any suitable shape, for example, cubical, and if ring-like they need not be circular. The preferred configuration, however, is one which provides end surfaces for engagement by the oppositely facing abutment surfaces of the housing members between which they are employed. The extent to which the elastomer members are compressed by any given load will be a function of their size, wall thickness, and the tensile strength and elasticity of the material of which they are made, etc. In the drawings the elastomer members are shown in the shape which they assume when not under load or at least not under sufficient load to deform them. Obviously the elastomer members must be of a construction such that they will not fail under the load to which they are subject in use. As an alternative construction the annular ring-like elastomer members may be solid.

From the foregoing description of preferred embodiments of the invention it will be apparent that the objects and advantages of the invention heretofore mentioned and others have been accomplished and that there has been provided a novel and improved overhead material handling apparatus which has many safety features, and otherwise, not incorporated in prior apparatuses.

What is claimed is:

1. In a cushioning load bearing device: a tubular rigid first member defining a peripherally extending wall and a transverse load bearing wall extending inwardly from said peripheral wall; a rigid second member loosely received in said peripheral wall, said second member having a periphery which is smaller than said peripheral wall so that a clearance opening is defined between the periphery of said second member and said peripheral wall of said first member, said clearance opening having a sufficient extent to allow universal relative movement between said first and second members, said second member defining a second load bearing wall spaced from said load bearing wall of said first member and in confronting relationship therewith, said peripheral wall and said first and second load bearing walls defining a chamber-like spaced within said first member; a rod-like member connected to one of said first and second members and extending through said chamber-like space; the other of said first and second members defining an aperture in its respective load bearing wall and through which said rod-like member projects with a second clearance opening, said second clearance opening having a sufficient extent to enable universal relative movement between said rod-like member and said other member; annular elastomer means in said chamber-like space and extending about said rod-like member in direct compressive load transmitting relationship with said first and second load bearing walls, said elastomer means substantially filling and conforming to the shape of said chamber-like space and being resiliently deformable in response to relative universal movement between said first member, said second member and said rod-like member to conform to consequent changes in shape of said chamber-like space while transmitting load between said members; a third member disposed in said chamber-like space between said elastomer means and one of said first and second members, said third member surrounding and engaging said rod-like member and overlying said second clearance opening to prevent a portion of said elastomer means from moving into said second clearance opening; and a fourth member positioned in said chamber-like space to overlie said first clearance opening and prevent a portion of said elastomer means from moving into said first clearance opening.

2. cushioning a cushion load bearing device: a tubular rigid first member defining a peripherally extending wall and a transverse load bearing wall extending inwardly from said peripheral wall; a rigid second member loosely received in said peripheral wall, said second member having a periphery which is smaller than said peripheral wall so that a clearance opening is defined between the periphery of said second member and said peripheral wall of said first member, said clearance opening having a sufficient extent to allow universal relative movement between said first and second members, said second member defining a second load bearing wall spaced from said load bearing wall of said first member and in confronting relationship therewith, said peripheral wall and said first and second load bearing walls defining a chamber-like space within said first member; a rod-like member connected to one of said first and second members and extending through said chamber-like space; the other of said first and second members defining an aperture in its respective load bearing wall and through which said rod-like member projects with a second clearance opening, said second clearance opening having a sufficient extent to enable universal relative movement between said rod-like member and said other member; annular elastomer means in said chamber-like space and extending about said rod-like member in direct compressive load transmitting relationship with said first and second load bearing walls, said elastomer means substantially filling and conforming to the shape of said chamber-like space and being resiliently deformable in response to relative universal movement between said first member, said second member and said rod-like member to conform to consequent changes in shape of said chamber-like space while transmitting load between said members, said elastomer means comprising a ring-like closed elastomer vessel having fluid therein; a third member disposed in said chamber-like space between said elastomer means and one of said first and second members, said third member surrounding and engaging said rod-like member and overlying said second clearance opening to prevent a portion of said elastomer means from moving into said second clearance opening; and a fourth member positioned in said chamber-like space to overlie said first clearance opening and prevent a portion of said elastomer means from moving into said first clearance opening.

3. In a cushioning load bearing device: a tubular rigid first member defining a peripherally extending wall and a transverse load bearing wall extending inwardly from said peripheral wall; a rigid second member loosely received in said peripheral wall, said second member having a periphery which is smaller than said peripheral wall so that a clearance opening is defined between the periphery of said second member and said peripheral wall of said first member, said clearance opening having a suffficient extent to allow universal relative movement between said first and second members, said second member defining a second load bearing wall spaced from said load bearing wall of said first member and in confronting relationship therewith, said peripheral wall and said first and second load bearing walls defining a chamber-like space within said first member; a rod-like member connected to one of said first and second members and extending through said chamber-like space; the other of said first and second members defining an aperture in its respective load bearing wall and through which said rod-like member projects with a second clearance opening, said second clearance opening having a sufficient extent to enable universal relative movement between said rod-like member and said other member; annular elastomer means in said chamber-like space and extending about said rod-like member in direct compressive load transmitting relationship with said first and second load bearing walls, said elastomer means substantially filling and conforming to the shape of said chamber-like space and being resiliently deformable in response to relative universal movement between said first member, said second member and said rod-like member to conform to consequent changes in shape of said chamber-like space while transmitting load between said members said elastomer means comprising a ring-like closed elastomer vessel having liquid therein; a third member disposed in said chamber-like space between said elastomer means and one of said first and second members, said third member surrounding and engaging said rod-like member and overlying said second clearance opening to prevent a portion of said elastomer means from moving into said second clearance opening; and a fourth member position in said chamber-like space to overlie said first clearance opening and prevent a portion of said elastomer means from moving into said first clearance opening.

4. In material handling apparatus having a first member, a second member, and a connection supporting said second member on said first member: a tubular rigid third member defining a peripherally extending wall and a transverse load bearing wall extending inwardly from said peripheral wall; a rigid fourth member loosely received in said peripheral wall, said fourth member having a periphery which is smaller than said peripheral wall so that a clearance opening is defined between the periphery of said fourth member and said peripheral wall of said third member, said clearance opening having a sufficient extent to allow universal relative movement between said third and fourth members, said fourth member defining a second load bearing wall spaced from said load bearing wall of said third member and in confronting relationship therewith, said peripheral wall and said first and second load bearing walls defining a chamber-like space within said third member; means for connecting one of said third and fourth members to one of said first and second members; a rod-like member connected to one of said third and fourth members and to the other one of said first and second members, said rod-like member extending through said chamber-like space; the other of said third and fourth members defining an aperture in its respective load bearing wall and through which said rod-like member projects with a second clearance opening, said second clearance opening having a sufficient extent to enable universal relative movement between said rod-like member and said other member; annular elastomer means in said chamber-like space and extending about said rod-like member in direct compressive load transmitting relationship with said first and second load bearing walls, said elastomer means substantially filling and conforming to the shape of said chamber-like space and being resiliently deformable in response to relative universal movement between said third member, said fourth member and said rod-like member to conform to consequent changes in shape of said chamber-like space while transmitting load between said members; a fifth member disposed in said chamber-like space between said elastomer means and one of said third and fourth members, said fifth member surrounding and engaging said rod-like member and overlying said second clearance opening to prevent a portion of said elastomer means from moving into said second clearance opening; and a sixth member positioned in said chamber-like space to overlie said first clearance opening and prevent a portion of said elastomer means from moving into said first clearance opening.

5. In material handling apparatus having a first member, a second member, and a connection supporting said second member on said first member: a tubular rigid third member defining a peripherally extending wall and a transverse load bearing wall extending inwardly from said peripheral wall; a rigid fourth member loosely received in said peripheral wall, said fourth member having a periphery which is smaller than said peripheral wall so that a clearance opening is defined between the periphery of said fourth member and said peripheral wall of said third member, said clearance opening having a sufficient extent to allow universal relative movement between said third and fourth members, said fourth member defining a second load bearing wall spaced from said load bearing wall of said third member and in confronting relationship therewith, said peripheral wall and said first and second load bearing walls defining a chamber-like space within said third member; means for connecting one of said third and fourth members to one of said first and second members; a rod-like member connected to one of said third and fourth members and to the other one of said first and second members, said rod-like member extending through said chamber-like space; the other of said third and fourth members defining an aperture in its respective load bearing wall and through which said rod-like member projects with a second clearance opening, said second clearance opening having a sufficient extent to enable universal relative movement between said rod-like member and said other member; annular elastomer means in said chamber-like space and extending about said rod-like member in direct compressive load transmitting relationship with said first and second load bearing walls, said elastomer means substantially filling and conforming to the shape of said chamber-like space and being resiliently deformable in response to relative universal movement between said third member, said fourth member and said rod-like member to conform to consequent changes in shape of said chamber-like space while transmitting load between said members, said elastomer means comprising a ring-like closed elastomer vessel having fluid therein; a fifth member disposed in said chamber-like space between said elastomer means and one of said third and fourth members, said fifth member surrounding and engaging said rod-like member and overlying said second clearance opening to prevent a portion of said elastomer means from moving into said second clearance opening; and a sixth member positioned in said chamber-like space to overlie said first clearance opening and prevent a portion of said elastomer means from moving into said first clearance opening.

6. In material handling apparatus having a first member, a second member, and a connection supporting said second member on said first member: a tubular rigid third member defining a peripherally extending wall and a transverse load bearing wall extending inwardly from said peripheral wall; a rigid fourth member loosely received in said peripheral wall, said fourth member having a periphery which is smaller than said peripheral wall so that a clearance opening is defined between the periphery of said fourth member and said peripheral wall of said third member, said clearance opening having a sufficient extent to allow universal relative movement between said third and fourth members, said fourth member defining a second load bearing wall spaced from said load bearing wall of said third member and in confronting relationship therewith, said peripheral wall and said first and second load bearing walls defining a chamber-like space within said third member; means for connecting one of said third and fourth members to one of said first and second members; a rod-like member connected to one of said third and fourth members and to the other one of said first and second members, said rod-like member extending through said chamber-like space; the other of said third and fourth members defining an aperture in its respective load bearing wall and through which said rod-like member projects with a second clearance opening, said second clearance opening having a sufficient extent to enable universal relative movement between said rod-like member and said other member; annular elastomer means in said chamber-like space and extending about said rod-like member in direct compressive load transmitting relationship with said first and second load bearing walls, said elastomer means substantially filling and conforming to the shape of said chamber-like space and being resiliently deformable in response to relative universal movement between said third member, said fourth member and said rod-like member to conform to consequent changes in shape of said chamber-like space while transmitting load between said members, said elastomer means comprising a ring-like closed elastomer vessel having liquid therein; a fifth member disposed in said chamber-like space between said elastomer means and one of said third and fourth members, said fifth member surrounding and engaging said rod-like member and overlying said second clearance opening to prevent a portion of said elastomer means from moving into said second clearance opening; and a sixth member positioned in said chamber-like space to overlie said first clearance opening and prevent a portion of said elastomer means from moving into said first clearance opening.

7. In an assembly for supporting a first member of a material handling apparatus on a second member of said apparatus: a tubular rigid third member defining a peripherally extending wall and a transverse load bearing wall extending inwardly from said peripheral wall; a rigid fourth member loosely received in said peripheral wall, said fourth member having a periphery which is smaller than said peripheral wall so that a clearance opening is defined between the periphery of said fourth member and said peripheral wall of said third member, said clearance opening having a sufficient extent to allow universal relative movement between said third and fourth members, said fourth member defining a second load bearing wall spaced from said load bearing wall of said third member and in confronting relationship therewith, said peripheral wall and said first and second load bearing walls defining a chamber-like space within said third member; means for connecting one of said third and fourth members to one of said first and second members; a rod-like member connected to one of said third and fourth members and extending through said chamber-like space; the other of said third and fourth members defining an aperture in its respective load bearing wall and through which said rod-like member projects with a second clearance opening, said second clearance opening having a sufficient extent to enable universal relative movement between said rod-like member and said other member; annular elastomer means in said chamber-like space and extending about said rod-like member in direct compressive load transmitting relationship with said first and second load bearing walls, said elastomer means substantially filling and conforming to the shape of said chamber-like space and being resiliently deformable in response to relative universal movement between said third member, said fourth member and said rod-like member to conform to consequent changes in shape of said chamber-like space while transmitting load between said members; a fifth member disposed in said chamber-like space between said elastomer means and one of said third and fourth members, said fifth member surrounding and engaging said rod-like member and overlying said second clearance opening to prevent a portion of said elastomer means from moving into said second clearance opening; and a sixth member positioned in said chamber-like space to overlie said first clearance opening and prevent a portion of said elastomer means from moving into said first clearance opening; a tubular rigid seventh member defining a peripherally extending wall and a transverse third load bearing wall extending inwardly from said peripheral wall; a rigid eighth member loosely received in said peripheral wall, said eighth member having a periphery which is smaller than said peripheral wall so that a third clearance opening is defined between the periphery of said eighth member and said peripheral wall of said seventh member, said third clearance opening having a sufficient extent to allow universal relative movement between aid seventh and eighth members, said eighth member defining a fourth load bearing wall spaced from said third load bearing wall of said seventh member and in confronting relationship therewith, said peripheral wall and said third and fourth load bearing walls defining a chamber-like space within said seventh member; means for connecting one of said seventh and eighth members to the other one of said first and second members; said rod-like member connected to the other one of said seventh and eighth members and extending through said second chamber-like space; said one of said seventh and eighth members defining an aperture in its respective load bearing wall and through which said rod-like member projects with a fourth clearance opening, said fourth clearance opening having a sufficient extent to enable universal relative movement between said rod-like member and said other member; second annular elastomer means in said second chamber-like space and extending about said rod-like member in direct compressive load transmitting relationship with said third and fourth load bearing walls, said second elastomer means substantially filling and conforming to the shape of said second chamber-like space and being resiliently deformable in response to relative universal movement between said seventh member, said eighth member and said rod-like member to conform to consequent changes in shape of said second chamber-like space while transmitting load between said seventh and eighth members; a ninth member disposed in said second chamber-like space between said second elastomer means and one of said seventh and eighth members, said ninth member surrounding and engaging said rod-like member and overlying said fourth clearance opening to prevent a portion of said elastomer means from moving into said fourth clearance opening; and a tenth member positioned in said second chamber-like space to overlie said third clearance opening and prevent a portion of said second elastomer means from moving into said third clearance opening.

8. In an assembly for supporting a first member of a material handling apparatus on a second member of said apparatus: a tubular rigid third member defining a peripherally extending wall and a transverse load bearing wall extending inwardly from said peripheral wall; a rigid fourth member loosely received in said peripheral wall, said fourth member having a periphery which is smaller than said peripheral wall so that a clearance opening is defined between the periphery of said fourth member and said peripheral wall of said third member, said clearance opening having a sufficient extent to allow universal relative movement between said third and fourth members, said fourth member defining a second load bearing wall spaced from said load bearing wall of said third member and in confronting relationship therewith, said peripheral wall and said first and second load bearing walls defining a chamber-like space within said third member; means for connecting one of said third and fourth members to one of said first and second members; a rod-like member connected to one of said third and fourth members and extending through said chamber-like space; the other of said third and fourth members defining an aperture in its respective load bearing wall and through which said rod-like member projects with a second clearance opening, said second clearance opening having a sufficient extent to enable universal relative movement between said rod-like member and said other member; annular elastomer means in said chamber-like space and extending about said rod-like member in direct compressive load transmitting relationship with said first and second load bearing walls, said elastomer means substantially filling and conforming to the shape of said chamber-like space and being resiliently deformable in response to relative universal movement between said third member, said fourth member and said rod-like member to conform to consequent changes in shape of said chamber-like space while transmitting load between said members, said elastomer means comprising a ring-like closed elastomer vessel having fluid therein; a fifth member disposed in said chamber-like spaced between said elastomer means and one of said third and fourth members, said fifth member surrounding and engaging said rod-like member and overlying said second clearance opening to prevent a portion of said elastomer means from moving into said second clearance opening; and a sixth member positioned in said chamber-like space to overlie said first clearance opening and prevent a portion of said elastomer means from moving into said first clearance opening; a tubular rigid seventh member defining a peripherally extending wall and a transverse third load bearing wall extending inwardly from said peripheral wall; a rigid eighth member loosely received in said peripheral wall, said eighth member having a periphery which is smaller than said peripheral wall so that a third clearance opening is defined between the periphery of said eighth member and said peripheral wall of said seventh member, said third clearance opening having a sufficient extent to allow universal relative movement between said seventh and eighth members, said eighth member defining a fourth load bearing wall spaced from said third load bearing wall of said seventh member and in confronting relationship therewith, said peripheral wall and said third and fourth load bearing walls defining a chamber-like space within said seventh walls defining a chamber-like space within said seventh member; means for connecting one of said seventh and eighth members to the other of said first and second members; said rod-like member connected to the other one of said seventh and eighth members and extending through said second chamber-like space; said one of said seventh and eighth members defining an aperture in its respective load bearing wall and through which said rod-like member projects with a fourth clearance opening, said fourth clearance opening having a sufficient extent to enable universal relative movement between said rod-like member and said other member; second annular elastomer means in said second chamber-like space and extending about said rod-like member in direct compressive load transmitting relationship with said third and fourth load bearing walls, said second elastomer means substantially filling and conforming to the shape of said second chamber-like space and being resiliently deformable in response to relative universal movement between said seventh member, said eighth member and said rod-like member to conform to consequent changes in shape of said second chamber-like space while transmitting load between said seventh and eighth members, said elastomer means comprising a ring-like closed elastomer vessel having fluid therein; a ninth member disposed in said second chamber-like space between said second elastomer means and one of seventh and eighth members, said ninth member surrounding and engaging said rod-like member and overlying said fourth clearance opening to prevent a portion of said elastomer means from moving into said fourth clearance opening; and a tenth member positioned in said second chamber-like space to overlie said third clearance opening and prevent a portion of said elastomer means from moving into said third clearance opening.

9. In an assembly for supporting a first member of a material handling apparatus on a second member of said apparatus: a tubular rigid third member defining a peripherally extending wall and a transverse load bearing wall extending inwardly from said peripheral wall; a rigid fourth member loosely received in said peripheral wall, said fourth member having a periphery which is smaller than said peripheral wall so that a clearance opening is defined between the periphery of said fourth member and said peripheral wall of said third member, said clearance opening having a sufficient extent to allow universal relative movement between said third and fourth members, said fourth member defining a second load bearing wall spaced from said load bearing wall of said third member and in confronting relationship therewith, said peripheral wall and said first and second load bearing walls defining a chamber-like space within said third member; means for connecting one of said third and fourth members to one of said first and second members; a rod-like member connected to one of said third and fourth members and extending through said chamber-like space; the other of said third and fourth members defining an aperture in its respective load bearing wall and through which said rod-like member projects with a second clearance opening, said second clearance opening having a sufficient extent to enable universal relative movement between said rod-like member and said other member; annular elastomer means in said chamber-like space and extending about said rod-like member in direction compressive load transmitting relationship with said first and second load bearing walls, said elastomer means substantially filling and conforming to the shape of said chamber-like space and being resiliently deformable in response to relative universal movement between said third member, said fourth member and said rod-like member to conform to consequent changes in shape of said chamber-like space while transmitting load between said members, said elastomer means comprising a ring-like closed elastomer vessel having liquid therein; a fifth member disposed in said chamber-like space between said elastomer means and one of said third and fourth members, said fifth member surrounding and engaging said rod-like member and overlying said second clearance opening to prevent a portion of said elastomer means from moving into said second clearance opening; and a sixth member positioned in said chamber-like space to overlie said first clearance opening and prevent a portion of said elastomer means from moving into said first clearance opening; a tubular rigid seventh member defining a peripherally extending wall and a transverse third load bearing wall extending inwardly from said peripheral wall; a rigid eighth member loosely received in said peripheral wall, said eighth member having a periphery which is smaller than said peripheral wall so that a third clearance opening is defined between the periphery of said eighth member and said peripheral wall of seventh member, said third clearance opening having a sufficient extent to allow universal relative movement between said seventh and eighth members, said eighth member defining a fourth load bearing wall spaced from said third load bearing wall of said seventh member and in confronting relationship therewith, said peripheral wall and said third and fourth load bearing walls defining a chamber-like space within said seventh member; means for connecting one of said seventh and eighth members to the other of said first and second members; said rod-like member connected to the other one of said seventh and eighth members and extending through said second chamber-like space; said one of said seventh and eighth members defining an aperture in its respective load bearing wall and through which said rod-like member projects with a fourth clearance opening, said fourth clearance opening having a sufficient extent to enable universal relative movement between said rod-like member and said other member; second annular elastomer means in said second chamber-like space and extending about said rod-like member in direct compressive load transmitting relationship with said third and fourth load bearing walls, said second elastomer means substantially filling and conforming to the shape of said second chamber-like space and being resiliently deformable in response to relative universal movement between said seventh member, said eighth member and said rod-like member to conform to consequent changes in shape of said second chamber-like space while transmitting load between said seventh and eighth members, said elastomer means comprising a ring-like closed elastomer vessel having liquid therein; a ninth member disposed in said second chamber-like space between said second elastomer means and one of said seventh and eighth members, said ninth member surrounding and engaging said rod-like member and overlying said fourth clearance opening to prevent a portion of said elastomer means from moving into said fourth clearance opening; and a tenth member positioned in said second chamber-like space to overlie said third clearance opening and prevent a portion of said elastomer means from moving into said third clearance opening.

10. In material handling apparatus having a first member, a second member, and a connection supporting said second member on said first member: a tubular rigid third member defining a peripherally extending wall and a transverse load bearing wall extending inwardly from said peripheral wall; a rigid fourth member loosely received in said peripheral wall, said fourth member having a periphery which is smaller than said peripheral wall so that a clearance opening is defined between the periphery of said fourth member and said peripheral wall of said third member, said clearance opening having a sufficient extent to allow universal relative movement between said third and fourth members, said fourth member defining a second load bearing wall spaced from said load bearing wall of said third member and in confronting relationship therewith, said peripheral wall and said first and second load bearing walls defining a chamber-like space within said third member; means for connecting one of said third and fourth members to one of said first and second members; a rod-like member connected to one of said third and fourth members and extending through said chamber-like space; the other of said third and fourth members defining an aperture in its respective load bearing wall and through which said rod-like member projects with a second clearance opening, said second clearance opening having a sufficient extent to enable universal relative movement between said rod-like member and said other member; annular elastomer means in said chamber-like space and extending about said rod-like member in direct compressive load transmitting relationship with said first and second load bearing walls, said elastomer means substantially filling and conforming to the shape of said chamber-like space and being resiliently deformable in response to relative universal movement between said third member, said fourth member and said rod-like member to conform to consequent changes in shape of said chamber-like space while transmitting load between said members, said elastomer means comprising a ring-like elastomer member having liquid therein; a fifth member disposed in said chamber-like space between said elastomer means and one of said third and fourth members, said fifth member surrounding and engaging said rod-like member and overlying said second clearance opening to prevent a portion of said elastomer means from moving into said second clearance opening; and a sixth member positioned in said chamber-like space to overlie said first clearance opening and prevent a portion of said elastomer means from moving into said first clearance opening; a tubular rigid seventh member defining a peripherally extending wall and a transverse third load bearing wall extending inwardly from said peripheral wall; a rigid eighth member loosely received in said peripheral wall, said eighth member having a periphery which is smaller than said peripheral wall so that a third clearance opening is defined between the periphery of said eighth member and said peripheral wall of said seventh member, said third clearance opening having a sufficient extent to allow universal relative movement between said seventh and eighth members, said eighth member defining a fourth load bearing wall spaced from said third load bearing wall of said seventh member and in confronting relationship therewith, said peripheral wall and said third and fourth load bearing walls defining a chamber-like space within said seventh member; means for connecting one of said seventh and eighth members to the other one of said first and second members; said rod-like member connected to the other one of said seventh and eighth members and extending through said second chamber-like space; said one of said seventh and eighth members defining an aperture in its respective load bearing wall and through which said rod-like member projects with a fourth clearance opening, said fourth clearance opening having a sufficient extent to enable universal relative movement between said rod-like member and said other member; second annular elastomer means in said second chamber-like space and extending about said rod-like member in direct compressive load transmitting relationship with said third and fourth load bearing walls, said second elastomer means substantially filling and conforming to the shape of said second chamber-like space and being resiliently deformable in response to relative universal movement between said seventh member, said eighth member and said rod-like member to conform to consequent changes in shape of said second chamber-like space while transmitting load between said seventh and eighth members, said second elastomer means comprising a ring-like elastomer member having liquid therein; a ninth member disposed in said second chamber-like space between said second elastomer means and one of said seventh and eighth members said ninth member surrounding and engaging said rod-like member and overlying said fourth clearance opening to prevent a portion of said elastomer means from moving into said fourth clearance opening; and a tenth member positioned in said second chamber-like space to overlie said third clearance opening and prevent a portion of said second elastomer means from moving into said third clearance opening.

11. In material handling apparatus having a first member, a second member, and means supporting said second member from said first member including two hanger assemblies each comprising: a tubular rigid member defining a peripherally extending wall and a transverse load bearing wall extending inwardly from said peripheral wall; a rigid fourth member loosely received in said peripheral wall, said fourth member having a periphery which is smaller than said peripheral wall so that a clearance opening is defined between the periphery of said fourth member and said peripheral wall of said third member, said clearance opening having a sufficient extent to allow universal relative movement between said third and fourth members, said fourth member defining a second load bearing wall spaced from said load bearing wall of said third member and in confronting relationship therewith, said peripheral wall and said first and second load bearing walls defining a chamber-like space within said third member; means for connecting one of said third and fourth members to one of said first and second members; a rod-like member connected to one of said third and fourth members and extending through said chamber-like space; the other of said third and fourth members defining an aperture in its respective load bearing wall and through which said rod-like member projects with a second clearance opening, said second clearance opening having a sufficient extent to enable universal relative movement between said rod-like member and said other member; annular elastomer means in said chamber-like space and extending about said rod-like member in direct compressive load transmitting relationship with said first and second load bearing walls, said elastomer means substantially filling and conforming to the shape of said chamber-like space and being resiliently deformable in response to relative universal movement between said third member, said fourth member and said rod-like member to conform to consequent changes in shape of said chamber-like space while transmitting load between said members; a fifth member disposed in said chamber-like space between said elastomer means and one of said third and fourth members, said fifth member surrounding and engaging said rod-like member and overlying said second clearance opening to prevent a portion of said elastomer means from moving into said second clearance opening; and a sixth member positioned in said chamber-like space to overlie said first clearance opening and prevent a portion of said elastomer means from moving into said first clearance opening; a tubular rigid seventh member defining a peripherally extending wall and a transverse third load bearing wall extending inwardly from said peripheral wall; a rigid eighth member loosely received in said peripheral wall, said eighth member having a periphery which is smaller than said peripheral wall so that a third clearance opening is defined between the periphery of said eighth member and said peripheral wall of said seventh member, said third clearance opening having a sufficient extent to allow universal relative movement between said seventh and eighth members, said eighth member defining a fourth load bearing wall spaced from said third load bearing wall of said seventh member and in confronting relationship therewith, said peripheral wall and said third and fourth load bearing walls defining a chamber-like space within said seventh member; means for connecting one of said seventh and eighth members to the other one of said first and second members; said rod-like member connected to the other one of said seventh and eighth members and extending through said second chamber-like space; said one of said seventh and eighth members defining an aperture in its respective load bearing wall and through which said rod-like member projects with a fourth clearance opening, said fourth clearance opening having a sufficient extent to enable universal relative movement between said rod-like member and said other member; second annular elastomer means in said second chamber-like space and extending about said rod-like member in direct compressive load transmitting relationship with said third and fourth load bearing walls, said second elastomer means substantially filling and conforming to the shape of said second chamber-like space and being resiliently deformable in response to relative universal movement between said seventh member, said eighth member and said rod-like member to conform to consequent changes in shape of said second chamber-like space while transmitting load between said seventh and eighth members; a ninth member disposed in said second chamber-like space between said second elastomer means and one of said seventh and eighth members, said ninth member surrounding and engaging said rod-like member and overlying said fourth clearance opening to prevent a portion of said elastomer means from moving into said fourth clearance opening; and a tenth member positioned in said second chamber-like space to overlie said third clearance opening and prevent a portion of said second elastomer means from moving into said third clearance opening; at least one of the first and second elastomer means of each hanger assembly comprising an elastomer vessel having fluid therein; and, conduit means for communicating a vessel having fluid therein of one hanger assembly to a vessel having fluid therein of the other hanger assembly so that fluid can flow from one vessel to the other.

12. In material handling apparatus having a first member, a second member, and means supporting said second member from said first member including two hanger assemblies each comprising: a tubular rigid third member defining a peripherally extending wall and a transverse load bearing wall extending inwardly from said peripheral wall; a rigid fourth member loosely received in said peripheral wall, said fourth member having a periphery which is smaller than said peripheral wall so that a clearance opening is defined between the periphery of said fourth member and said peripheral wall of said third member, said clearance opening having a sufficient extent to allow universal relative movement between said third and fourth members, said fourth member defining a second load bearing wall spaced from said load bearing wall of said third member and in confronting relationship therewith, said peripheral wall and said first and second load bearing walls defining a chamber-like space within said third member; means for connecting one of said third and fourth members to one of said first and second members; a rod-like member connected to one of said third and fourth members and extending through said chamber-like space; the other of said third and fourth members defining an aperture in its respective load bearing wall and through which said rod-like member projects with a second clearance opening, said second clearance opening having a sufficient extent to enable universal relative movement between said rod-like member and said other member; annular elastomer means in said chamber-like space and extending about said rod-like member in direct compressive load transmitting relationship with said first and second load bearing walls, said elastomer means substantially filling and conforming to the shape of said chamber-like space and being resiliently deformable in response to relative universal movement between said third member, said fourth member and said rod-like member to conform to consequent changes in shape of said chamber-like space while transmitting load between said members; a fifth member disposed in said chamber-like space between said elastomer means and one of said third and fourth members, said fifth member surrounding and engaging said rod-like member and overlying said second clearance opening to prevent a portion of said elastomer means from moving into said second clearance opening; and a sixth member positioned in said chamber-like space to overlie said first clearance opening and prevent a portion of said elastomer means from moving into said first clearance opening; a tubular rigid seventh member defining peripherally extending wall and a transverse third load bearing wall extending inwardly from said peripheral wall; a rigid eighth member loosely received in said peripheral wall, said eighth member having a periphery which is smaller than said peripheral wall so that a third clearance opening is defined between the periphery of said eighth member and said peripheral wall of said seventh member, said third clearance opening having a sufficient extent to allow universal relative movement between said seventh and eighth members, said eighth member defining a fourth load bearing wall spaced from said third load bearing wall of said seventh member and in confronting relationship therewith, said peripheral wall and said third and fourth load bearing walls defining a chamber-like space within said seventh member; means for connecting one of said seventh and eighth members to the other one of said first and second members; said rod-like member connected to the other one of said seventh and eighth members and extending through said second chamber-like space; said one of said seventh and eighth members defining an aperture in its respective load bearing wall and through which said rod-like member projects with a fourth clearance opening, said fourth clearance opening having a sufficient extent to enable universal relative movement between said rod-like member and said other member; second annular elastomer means in said second chamber-like space and extending about said rod-like member in direct compressive load transmitting relationship with said third and fourth load bearing walls, said second elastomer means substantially filling and conforming to the shape of said second chamber-like space and being resiliently deformable in response to relative universal movement between said seventh member, said eighth member and said rod-like member to conform to consequent changes in shape of said second chamber-like space while transmitting load between said seventh and eighth members; a ninth member disposed in said second chamber-like space between said second elastomer means and one of said seventh and eighth members, said ninth member surrounding and engaging said rod-like member and overlying said fourth clearance opening to prevent a portion of said elastomer means from moving into said fourth clearance opening; and a tenth member positioned in said second chamber-like space to overlie said third clearance opening and prevent a portion of said second elastomer means from moving into said third clearance opening; at least one of the first and second elastomer means of each hanger assembly comprising an elastomer vessel having liquid therein; and, conduit means for communicating a vessel having liquid therein of one hanger assembly to a vessel having liquid therein of the other hanger assembly so that liquid can flow from one vessel to the other.

* * * * *

UNITED STATES PATENT AND TRADEMARK OFFICE
CERTIFICATE OF CORRECTION

PATENT NO. : 3,949,961
DATED : April 13, 1976
INVENTOR(S) : Karl A. Pamer

It is certified that error appears in the above-identified patent and that said Letters Patent are hereby corrected as shown below:

Column 6, line 23, after "2." cancel "cushioning a cushion" and substitute --In a cushioning--.

Signed and Sealed this

Nineteenth Day of October 1976

[SEAL]

Attest:

RUTH C. MASON
Attesting Officer

C. MARSHALL DANN
Commissioner of Patents and Trademarks